(12) United States Patent
Bernhardt et al.

(10) Patent No.: US 9,240,261 B2
(45) Date of Patent: Jan. 19, 2016

(54) MULTI-CONDUCTOR CABLES WITH SPACERS FOR CONDUCTORS

(71) Applicant: Radio Frequency Systems, Inc., Meriden, CT (US)

(72) Inventors: Timothy Bernhardt, Cheshire, CT (US); Yin-Shing Chong, Middletown, CT (US)

(73) Assignee: ALCATEL-LUCENT SHANGHAI BELL CO., LTD, Shaghai (CN)

( * ) Notice: Subject to any disclaimer, the term of this patent is extended or adjusted under 35 U.S.C. 154(b) by 208 days.

(21) Appl. No.: 13/946,348

(22) Filed: Jul. 19, 2013

(65) Prior Publication Data

US 2015/0021068 A1    Jan. 22, 2015

(51) Int. Cl.
  *H01B 7/282*    (2006.01)
  *B29C 65/70*    (2006.01)
  *H01B 13/32*    (2006.01)
  *B29K 75/00*    (2006.01)
  *B29L 31/34*    (2006.01)
  *G02B 6/44*     (2006.01)

(52) U.S. Cl.
  CPC ............... *H01B 7/282* (2013.01); *B29C 65/70* (2013.01); *G02B 6/4471* (2013.01); *H01B 13/322* (2013.01); *B29K 2075/00* (2013.01); *B29L 2031/3462* (2013.01); *G02B 6/4416* (2013.01)

(58) Field of Classification Search
  USPC ......... 174/74 R, 74 A, DIG. 8, 77 R; 428/36; 156/86
  See application file for complete search history.

(56) References Cited

U.S. PATENT DOCUMENTS

| 4,343,844 | A | * | 8/1982 | Thayer et al. ................ 428/34.9 |
| 5,119,457 | A | * | 6/1992 | Callahan ........................ 385/107 |
| 5,204,933 | A | * | 4/1993 | Marx ................................ 385/53 |
| 5,517,592 | A | * | 5/1996 | Grajewski et al. ............. 385/138 |
| 2012/0029483 | A1 | | 2/2012 | Griffith et al. |

FOREIGN PATENT DOCUMENTS

| EP | 2 087 921 | 8/2009 |
| WO | WO 2006/127123 | 11/2006 |
| WO | WO 2013/134486 | 9/2013 |

* cited by examiner

*Primary Examiner* — William H Mayo, III
(74) *Attorney, Agent, or Firm* — Capitol Patent & Trademark Law Firm, PLLC

(57) ABSTRACT

Multi-conductor cables for telecommunication systems include a plurality of fiber-optic conductors and/or power conductors extending within an outer jacket in a main body portion of the cable, and extending outside of the outer jacket in a break-out portion of the cable. A break-out boot may be attached to the outer jacket and may surround the conductors in a break-out portion of the cable. Potting material may be provided in the break-out boot within spaces between adjacent conductors to provide innovative sealing of the break-out portion.

18 Claims, 7 Drawing Sheets

MULTI-CONDUCTOR CABLES WITH SPACERS FOR CONDUCTORS

BACKGROUND OF THE INVENTION

Multi-conductor cables often include multiple conductors, or individual cable members, bundled together within an outer jacket. The conductors may extend outside of the outer jacket through an open end of the outer jacket at or near an end portion of the cable. The area in the vicinity of the open end of the outer jacket may be referred to as the break-out portion of the cable. In order to protect the cable from water and other environmental elements, the open end of the outer jacket is typically sealed by sealing material(s) and components at the break-out portion.

One known solution for sealing the break-out portion of a multi-conductor cable includes arranging a boot around the conductors and a portion of the outer jacket near the open end of the outer jacket. Heat shrink material of the boot is shrunk down around the end portion of the outer jacket, thereby creating a cavity into which potting material is injected or poured. However, this solution creates a problem ensuring that the potting material flows into spaces between each conductor within the boot. If any of the conductors are contacting each other side-by-side in a tangential manner within the break-out portion of the cable when the potting material is injected or poured into the boot, the potting material may not flow between the conductors properly, thereby allowing water and/or other environmental elements to wick down the interior of cable over time. This may lead to short-circuiting, corrosion and/or damage from freezing and thawing cycles.

An alternative known solution for sealing the break-out portion of a multi-conductor cable involves over-molding a boot at the break-out portion. According to this solution, the break-out portion of the cable is inserted into a two-part mold which is then injected with potting material. In order to provide reliable sealing, the length of the boot and the amount of potting material is increased. This solution requires excess potting material, increases cable size, increases manufacturing costs and is not as reliable as desired for long-term outdoor exposure of the cable.

Accordingly, it is desirable to provide multi-conductor cables and methods of assembling multi-conductor cables that provide sealing at the break-out portion without requiring excessive sealing materials, excessive cost or excessive increases in cable size.

SUMMARY OF THE INVENTION

The disclosure concerns multi-conductor cables including a plurality of conductors and innovative sealing of interiors of the cables at break-out portions of the cables. The disclosure further concerns a method of assembling such multi-conductor cables. According to the invention, innovative sealing may be provided at the break-out portion of a multi-conductor cable by a break-out boot surrounding the conductors, at least one spacer engaging and separating the conductors, and potting material disposed in spaces between the conductors.

According to an embodiment of the invention, a multi-conductor cable may include a main body portion, a break-out portion adjacent to the main body portion, an outer jacket in the main body portion, and a plurality of conductors extending within the outer jacket in the main body portion and extending outside of the outer jacket in the break-out portion. The cable may include a break-out boot attached to the outer jacket and surrounding the plurality of conductors in the break-out portion. At least one conductor spacer may be disposed within the break-out boot. The at least one conductor spacer may be arranged to engage the plurality of conductors and retain the plurality of conductors in a spaced relationship with one another in the break-out portion. Sealing material may be disposed in the break-out boot in spaces between the conductor spacer and the plurality of conductors.

According to another embodiment of the invention, a method of assembling a multi-conductor cable may be provided. The method may include providing a multi-conductor cable including a main body portion, a break-out portion adjacent to the main body portion, an outer jacket in the main body portion, and a plurality of conductors extending within the outer jacket in the main body portion and extending outside of the outer jacket in the break-out portion. The method may include arranging at least one conductor spacer within the break-out portion to engage the plurality of conductors and retain the plurality of conductors in a spaced relationship with one another. The method may further include attaching a break-out boot to the outer jacket and arranging the break-out boot around the plurality of conductors in the break-out portion. Sealing material may be placed in the break-out boot in spaces between the conductor spacer and the plurality of conductors.

Additional features and advantages of the invention will be apparent to those skilled in the art based on the following detailed description and appended drawings.

DETAILED DESCRIPTION OF THE INVENTION

Figure 1:
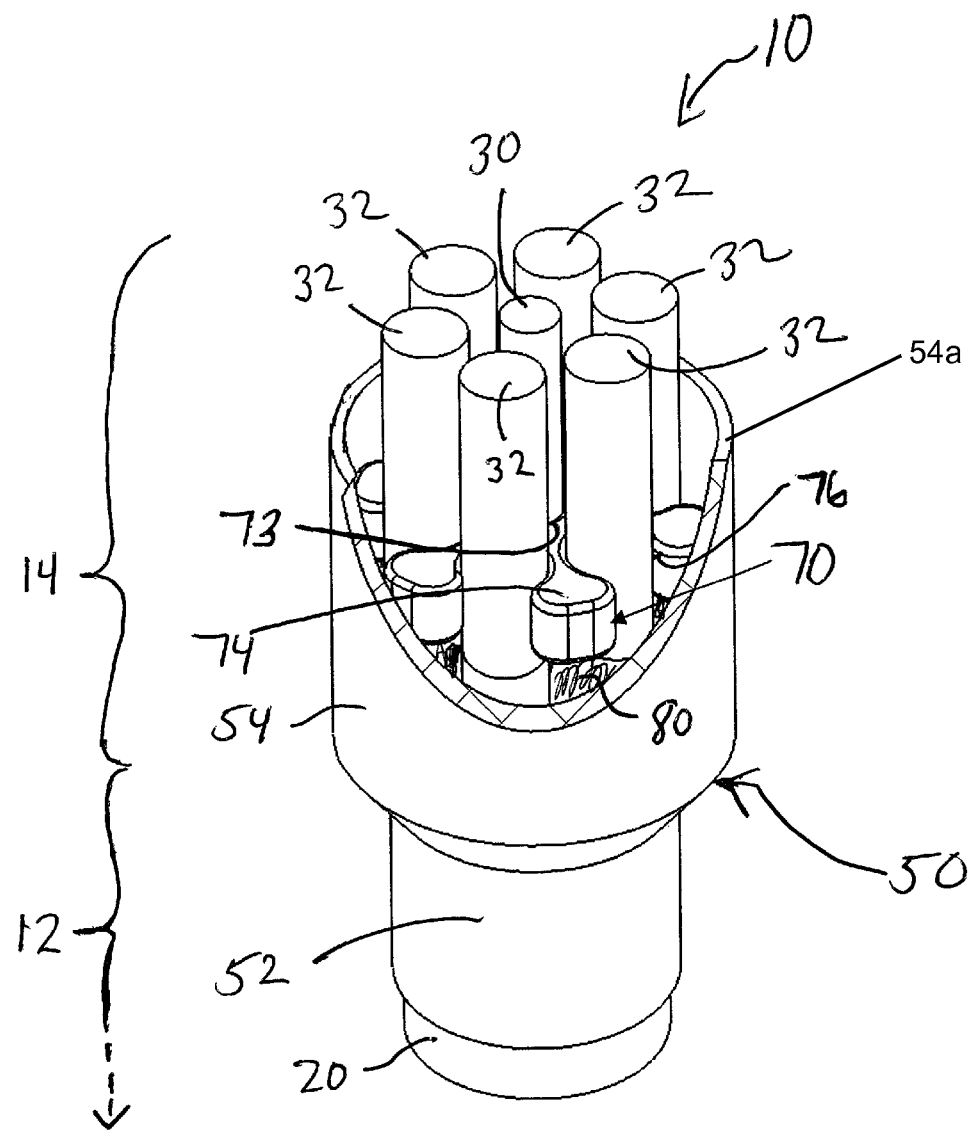
FIG. 1 is a partial perspective view of a multi-conductor cable according to an embodiment of the invention.

The following description discloses exemplary multi-conductor cables. The cables may be used for connecting remote radio heads (RRHs) to base stations (BTSs/NodeBs/eNodeBs) in cellular telecommunication networks, for example. However, it should be understood that the cables, components, features and methods described herein merely represent exemplary embodiments of the invention, and that variations of the disclosed embodiments are possible within the scope of the invention. Furthermore, multi-conductor cables according to the disclosure may be used for connecting equipment or devices other than RRHs and base stations, and may further be used in applications other than cellular telecommunication networks.

It is noted that, throughout the following description and appended drawings, the same reference numerals and characters refer to the same elements, features and structures.

Figure 2:
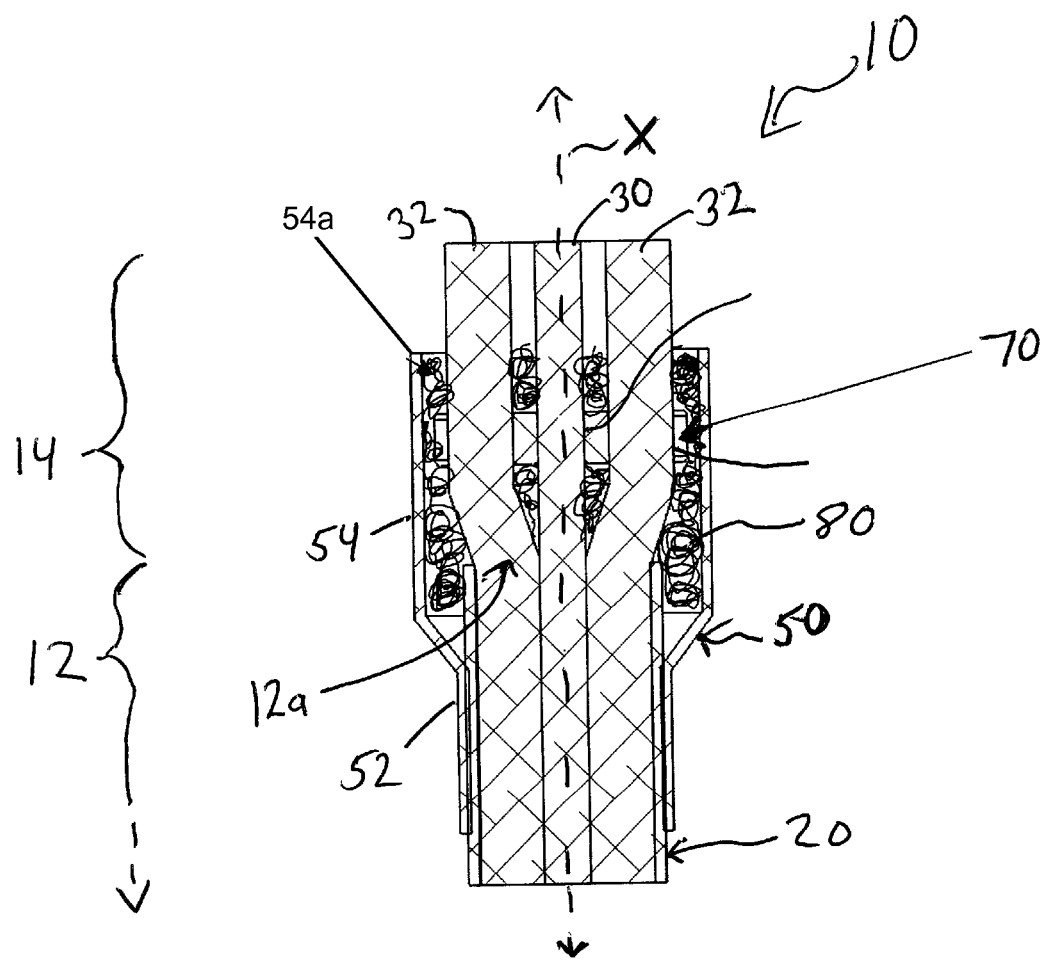
FIG. 2 is a partial, side cross-sectional view of the cable of FIG. 1.

FIGS. 1 and 2 show a multi-conductor cable 10 according to an embodiment of the invention. The cable 10 may include a main body portion 12 and a break-out portion 14 beginning at an end 12*a* of the main body portion 12. The break-out portion 14 may extend to a termination portion (not shown) for connecting the cable 10 to a device such as an RRH or base station. The cable 10 may include another breakout portion (not shown) beginning at an opposite end (not shown) of the cable 10 and extending to another termination portion (not shown).

Continuing with reference to FIGS. 1 and 2, in the main body portion 12, the cable 10 may include an outer jacket 20 and a plurality of conductors 30, 32 disposed inside the outer jacket 20. The conductors 30, 32 may extend outside of the outer jacket 20 in the breakout portion 14 and may be separated from one another in the breakout portion 14. According to an embodiment, the conductor 30 may be an electrical power conductor configured to transmit power signals, and the conductors 32 may be fiber-optic telecommunication conductors configured to transmit radio frequency (RF) signals. According to an embodiment, the conductor 30 may be disposed substantially along a central axis X of the outer jacket 20, and the conductors 32 may disposed around of the conductor 30 in a substantially annular pattern. However, it should be understood that the other types, numbers, combinations and configurations of conductors are possible.

Figure 3:
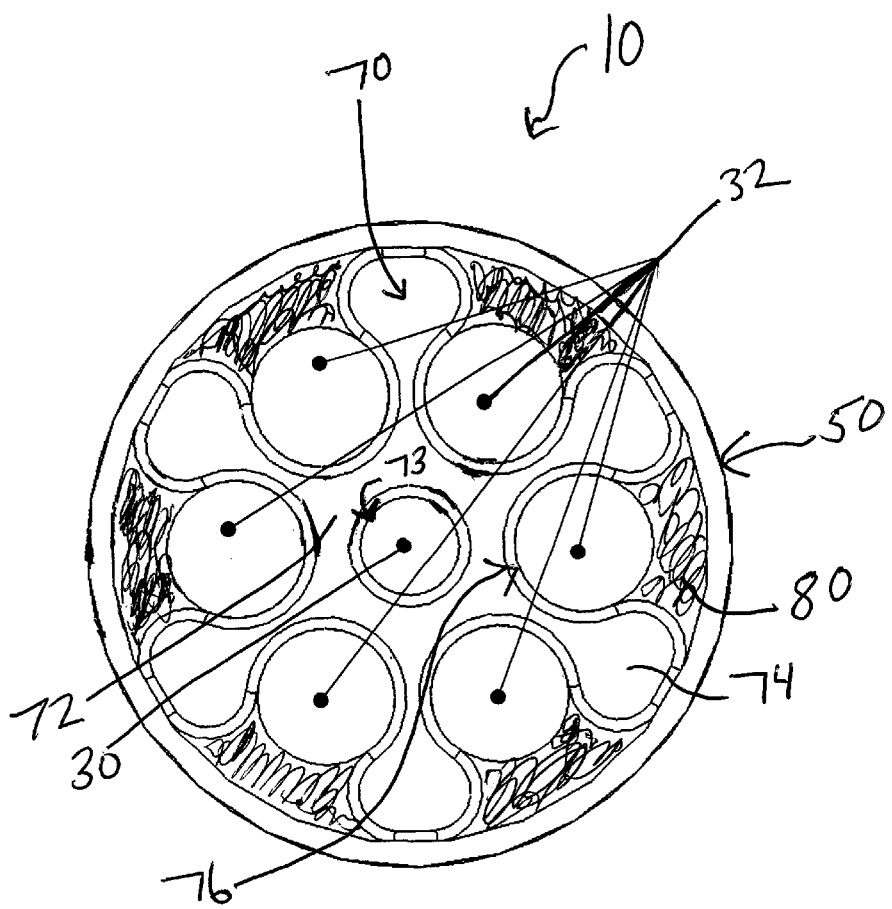
FIG. 3 is a top cross-sectional view of the cable of FIG. 1, at a break-out portion of the cable.

As illustrated in FIG. 2, the outer jacket 20 may terminate at the end 12*a* of the main body portion 12, and the break-out portion 14 begins at the end 12*a* of the main body portion 12. The conductors 30, 32 may extend outside of the outer jacket 20 in the break-out portion 14. As shown in FIGS. 1-3, the conductors 30, 32 may be spaced apart from one another in the break-out portion 14.

As shown in FIGS. 1-3, a break-out boot or sleeve 50 may be attached to the cable 10, surrounding the conductors 30, 32 in the break-out portion 14 in order to protect the conductors 30, 32 from physical and elemental damage. The boot 50 may be constructed of a rubber, plastic or woven material for example. The boot 50 may include a first boot portion 52 and a second boot portion 54 extending from the second boot portion 52. The portions 52, 54 may be integrally formed such that the boot 50 may be a one-piece structure. The first boot portion 52 may be attached to the outer jacket 20 near the end 12*a* of the main body portion 12 of the cable 10, and may be secured to the outer jacket 20 by a heat-shrink fit, a clamping device, and/or an adhesive bond, for example.

Continuing with reference to FIGS. 1-3, a conductor spacer 70 may be disposed within the break-out boot 50 in the break-out portion 14. Preferably, the spacer 70 may be positioned in a middle area of the break-out portion 14. The spacer 70 may be arranged such that it engages each of the conductors 30, 32 and maintains a desired spacing between adjacent conductors 30, 32. The conductor spacer 70 may be constructed of a plastic or rubber material, for example.

Figure 4:
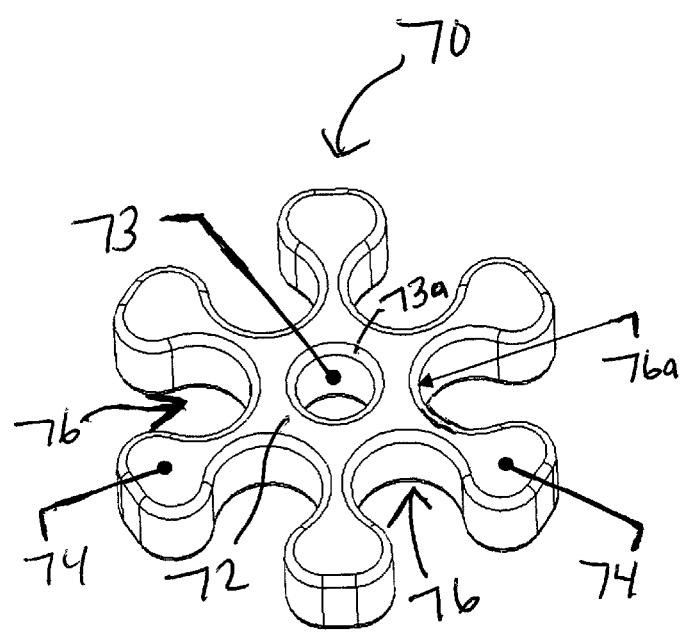
FIG. 4 shows a conductor spacer of the cable of FIG. 1.

FIG. 4 shows the conductor spacer 70 in greater detail. As shown in FIG. 4, the spacer 70 may include a central portion 72 and a plurality of arm members 74 extending radially from the central portion 72. The central portion 72 may include a central opening or pocket 73 for engaging and retaining the conductor 30 and a plurality of outer openings or recesses 76 defined by the arm members 74 for engaging and retaining the conductors 32. The central opening 73 and the outer openings 76 may be sized and shaped to tightly engage the conductors 30, 32 respectively, as shown in FIGS. 1-3. According to a preferred embodiment, the outer openings 76 may be sized and shaped to engage the respective conductors 32 by a press fit or snap-in fit. As illustrated in FIG. 4, according to an embodiment, the central opening 73 may have a substantially circular shape and the outer openings 76 may be substantially U-shaped or horseshoe-shaped. Additionally, the openings 73, 76 may have radiused or beveled edges 73*a*, 76*a* to enable the spacer 70 to slide as needed during assembly of the cable 10.

It should be understood that the openings 73, 76 may have shapes other than those specifically shown and described herein. Additionally, the number and arrangement of the openings or recesses 73, 76 may be varied. Furthermore, it should be understood that the spacer 70 may have a configuration that may be different than the configuration shown and described herein. For example, the spacer 70 may have another suitable configuration that provides structures or components for retaining the conductors 30, 32.

Referring back to FIGS. 1-3, sealing material or potting material 80 may be provided in the break-out portion 14. The potting material 80 may be disposed inside the boot 50 in spaces defined between adjacent conductors 30, 32, and may cover the spacer 70. As shown in FIG. 3, in which the cable 10 may be in a vertical orientation, the potting material 80 may be disposed both below and above the spacer 70 within the boot 50 (i.e., between the outer jacket 20 and the spacer 70, and between the spacer 70 and an outer end 54*a* of the boot 50). The potting material 80 forms a seal against water and other outside elements in the break-out portion 14, thereby preventing outside elements from entering the interior of the outer jacket 20 through the break-out portion 14. The potting material 80 may also seal the spacer 70 within the boot 50. The potting material 80 may be a two-part urethane potting material, for example. Preferably, the potting material 80 may be a two-part urethane potting material with the following characteristics: a low viscosity to enable the potting material to flow freely into the boot, between adjacent conductors 30, 32 and the spacer 70 without trapping air bubbles; a cure time that may be sufficiently short so as to not hinder production and moving of the cable 10 to storage after potting, but sufficiently long to enable the potting material to self-level before hardening; and sufficient flexibility after curing/hardening in order to provide strain relief of the conductors 30, 32 during handling and installation. Additionally, the potting material 80, as well as all other exposed materials of the cable 10, may be U.V. tolerant. However, it should be understood that other types of potting materials are possible.

A method of assembling the cable 10 will now be described with respect to FIGS. 1 and 4. According to an embodiment, the spacer 70 may be arranged within the break-out portion 14 such that the holes or pockets 73, 76 engage and retain respective conductors 30, 32. Thereafter, the boot 50 may be attached to the outer jacket 20 such that the boot 50 surrounds the conductors 30, 32 and the spacer 70 in the break-out portion 14. The boot may be secured to the outer jacket 20 by heat-shrinking, clamping and/or bonding the boot portion 52 onto the outer jacket 20. Thereafter, the potting material 80 may be poured, injected or otherwise placed into the boot 50 within the spaces defined between adjacent conductors 30, 32 and over the spacer 70.

According to an alternate embodiment, boot 50 may be attached to the outer jacket 20 prior to arranging the spacer 70 within the break-out portion 14.

Figure 5:
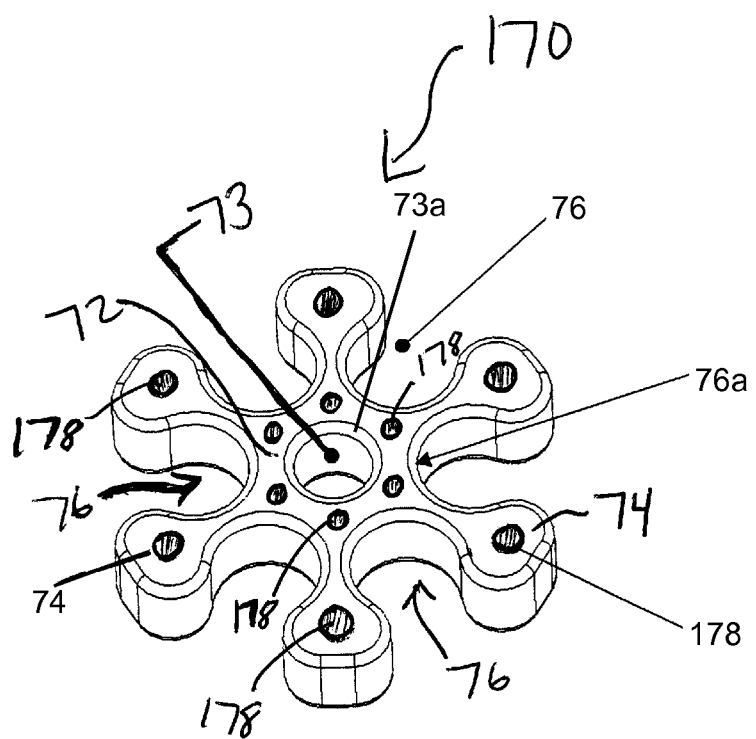
FIG. 5 shows a conductor spacer according to another embodiment of the invention.

FIG. 5 shows a conductor spacer 170 according to another embodiment. The spacer 170 may be a variation of the spacer 70 shown in FIGS. 1-4, and may be used in place of the spacer 70. The spacer 170 may be similar to the spacer 70, except that the spacer 170 may include one or more openings 178 therein which are configured to allow the potting material 80 to flow through the spacer 170. More specifically, the potting material 80 can flow through the openings 178 when the potting material 80 is poured into the boot 50 to promote more even distribution of the potting material 80 within the boot 50. It should be understood that the openings 178 may be arranged and/or shaped differently than shown in FIG. 5, and that more or fewer openings 178 may be provided.

Figure 6:
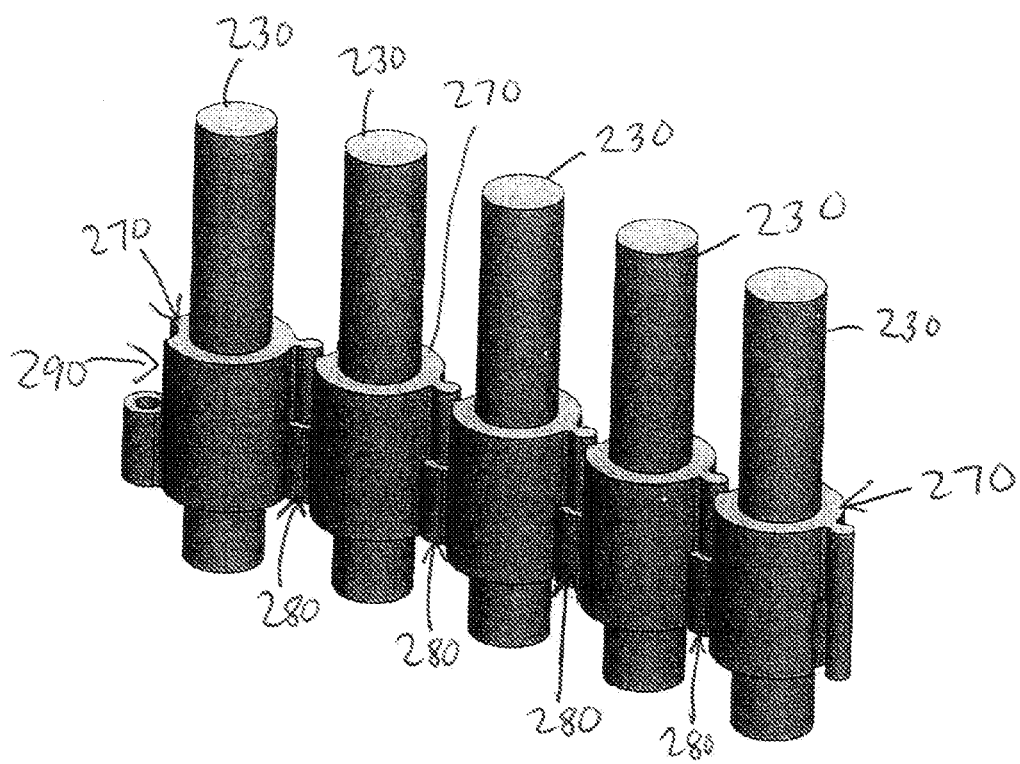
FIG. 6 illustrates a plurality of conductor spacers engaging and separating conductors of multi-conductor cable, according to another embodiment of the invention.
Figure 7:
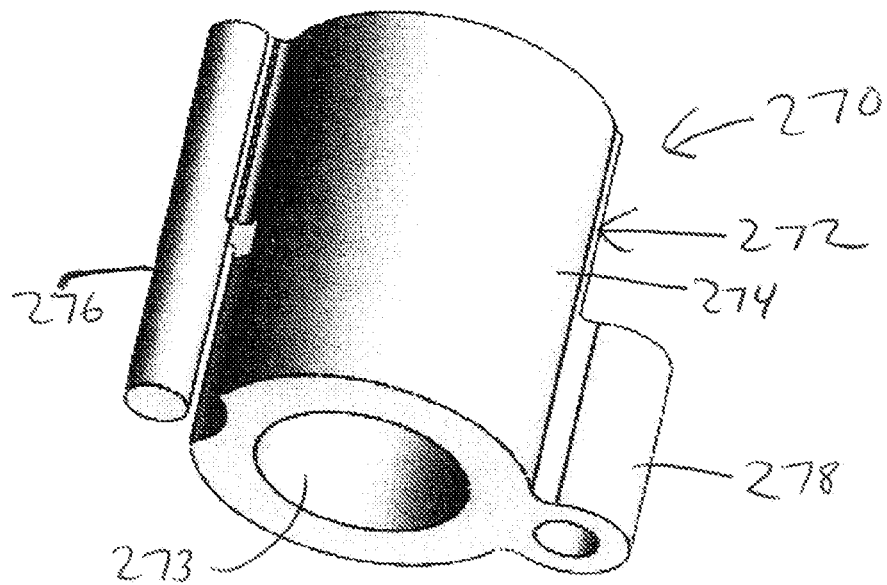
FIG. 7 is a perspective view of a conductor spacer of the embodiment of FIG. 6.
Figure 8:
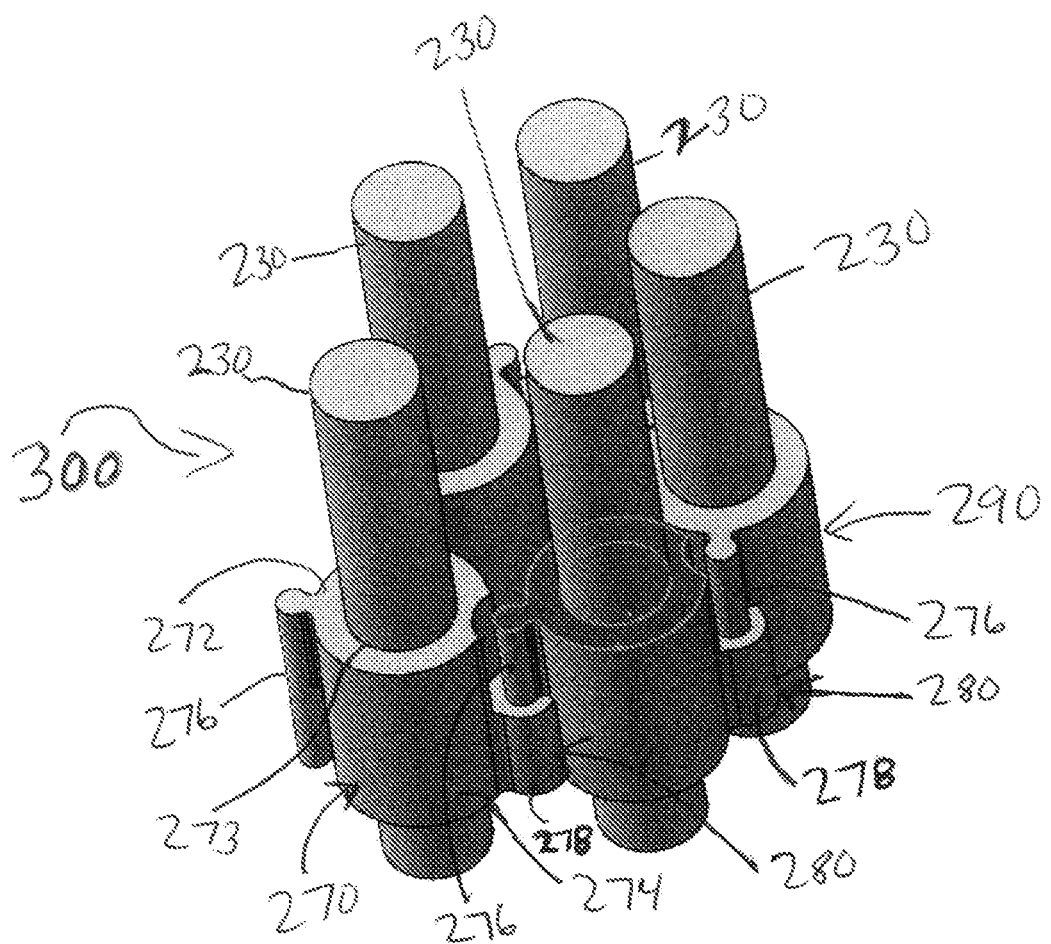
FIG. 8 illustrates the arrangement of FIG. 6 with the conductors bundled for positioning within a break-out boot of a multi-conductor cable.

FIGS. 6-8 illustrate conductor spacers 270 which may be used to arrange conductors 230 within a break-out boot (e.g., the boot 50 of FIGS. 1-3) of a multi-conductor cable (not shown) according to another embodiment of the invention. The spacers 270 may be used in place of the spacers 70, 170 described above.

As shown in FIG. 6, a plurality of conductors 230 may be retained together by a plurality of spacers 270. The conductors 230 may include fiber-optic telecommunication conductors, electrical power conductors, and/or other types of conductors. Each spacer 270 may receive and retain a respective conductor 230, and each spacer 270 may be pivotably connected to an adjacent spacer 270 at a pivot connection 280 such that the spacers 270 form a continuous chain or linkage 290 of spacers.

Turning to FIG. 7, each spacer 270 may have a substantially hollow body member 272 including central hole or bore 273 through which a conductor 230 may be inserted. The bore 273 may be sized and shaped to tightly engage and retain a conductor 230. Although the body member 272 is shown to have a cylindrical shape, other shapes are possible. Each spacer 270 may include a male connecting member or pivot arm 276 attached to the sidewall 274 of the body member 272 and a female connecting member or pivot mount 278 attached to the sidewall 274 at a position generally opposite the position of the male pivot arm 276. The pivot mount 278 may be a hollow, cylindrical member, for example. The spacers 270 may be constructed of a plastic or rubber material, for example.

As shown in FIG. 6, the pivot arm 276 of a given spacer 270 may be configured to be pivotably mounted in and interlocked with a pivot mount 278 of an adjacent spacer 270 to form a joint 280, thereby enabling pivoting of adjacent spacers 270 with respect to each other. Accordingly, the pivot mount 278 of a given spacer 270 may be configured to pivotably receive and interlock with a pivot arm 276 of adjacent spacer 270 to form a joint 280. Although the male connecting member 276 and female connecting member 278 are respectively shown and described as a pivot arm and a hollow, cylindrical member, other types of interlocking members may be provided to form the joints 280. Furthermore, although the joints 280 are shown and described as being pivoting joints formed by interlocking pivot members, the joints 280 may instead be flexible joints formed by interlocking flexible members. Said another way, the members 276, 278 may be configured to bend or flex rather than pivot.

FIG. 8 illustrates how the linkage 290 of spacers 270 may be arranged such that the conductors 230 are bundled for positioning within a break-out boot (e.g., the boot 50 in FIGS. 1-3). As shown in FIG. 8, the conductors 230 may be arranged into a compact bundle 300 such that a desired arrangement of the conductors 230 and desired spacing between adjacent conductors 230 may be achieved. In the bundle 300, the spacers may be in pivoted or folded positions with respect to each other at their joints 280 such that the linkage 290 may be in a folded configuration. The bundle 300 can be enclosed within the breakout boot and the break-out boot can be filled with potting material (e.g., the potting material 80 in FIGS. 1-3) as described above with respect to the embodiment of FIGS. 1-3.

A multi-conductor cable including the spacers 270 can be fabricated by a method similar to the method described above with respect to the cable 10. According to an embodiment, the conductors 230 may be inserted into the bores 273 of respective spacers 270. The spacers 270 may be arranged in a break-out portion (e.g., the break-out portion 14 of FIGS. 1-3) of the cable. The spacers 270 may be connected to each other at pivot joints 280 to form the linkage 290 (FIG. 6) either before or after inserting the conductors 230 into the bores 273. The conductors 230 may be arranged into the compact bundle 300 (FIG. 8) such that a desired arrangement of the conductors 230 and desired spacing between adjacent conductors 230 may be achieved. The break-out boot may be attached to an outer jacket (e.g., the outer jacket 20 of FIGS. 1 and 2) of the cable such that the break-out boot surrounds the conductors 230 and the spacers 270 in the break-out portion. The break-out boot may be secured to the outer jacket by heat-shrinking, clamping and/or bonding the boot portion 52 onto the outer jacket 20. Thereafter, potting material (e.g., the potting material 80 of FIGS. 1-3) may be poured, injected or otherwise placed into the break-out boot within the spaces defined between adjacent conductors 230 and over the spacers 270. It is noted that the break-out boot may be attached to the outer jacket of the cable at any point during the fabrication process prior to placing the potting material into the break-out boot.

The spacers 70, 170, 270 disclosed herein are configured to establish and maintain a desired spacing between adjacent conductors in the break-out portion of a multi-conductor cable. Accordingly, potting material may be allowed to properly flow and settle between adjacent conductors when the potting material 80 may be introduced into a break-out boot of the cable. In other words, the disclosed spacers are configured to promote even distribution of potting material within the break-out boot. Accordingly, the disclosed spacers 70, 170, 270 help to ensure that the potting material provides effective sealing of the interior of outer jacket of the cable against outside elements.

It should be understood that the disclosure merely provides exemplary embodiments of the invention. One of ordinary skill in the art will appreciate that changes and variations to the disclosed components, features and methods can be made without departing from the spirit and scope of the invention as set forth in the appended claims.

What is claimed is:

1. A multi-conductor cable, comprising:
a main body portion;
a break-out portion adjacent to the main body portion;
an outer jacket in the main body portion;
a plurality of conductors extending within the outer jacket in the main body portion and extending outside of the outer jacket in the break-out portion;
a break-out boot attached to the outer jacket and surrounding the plurality of conductors in the break-out portion;
at least one conductor spacer disposed within the break-out boot, wherein the at least one conductor spacer is arranged to engage the plurality of conductors and retain the plurality of conductors in a spaced relationship with one another in the break-out portion; and
sealing material disposed in the break-out boot in spaces between the plurality of conductors.

2. The cable of claim 1, wherein the at least one conductor spacer comprises a plurality of openings configured to engage and retain the plurality of conductors.

3. The cable of claim 1, wherein the at least one conductor spacer comprises a plurality of openings configured to enable the sealing material to flow through the at least one conductor spacer.

4. The cable of claim 1, wherein:
the plurality of conductors comprises a center conductor disposed substantially along a central axis of the outer jacket and a plurality of outer conductors disposed around the center conductor; and
the at least one conductor spacer comprises,
a central portion defining a central opening configured to engage and retain the center conductor, and
a plurality of arm members extending radially from the central portion and defining a plurality of outer openings configured to engage and retain the plurality of outer conductors.

5. The cable of claim 1, wherein the at least one conductor spacer comprises a plurality of conductor spacers connected to each other to form a foldable linkage of conductor spacers, each conductor spacer among the plurality of conductor spacers comprising a body member including a central opening configured to receive and engage a respective conductor among the plurality of conductors.

6. The cable of claim 5, wherein adjacent conductor spacers among the plurality of conductor spacers are connected at pivoting joints formed by interlocking pivot members.

7. The cable of claim 5, wherein adjacent conductor spacers among the plurality of conductor spacers are connected at flexible joints formed by interlocking flexible members.

8. The cable of claim 1, wherein the sealing material is a urethane material.

9. The cable of claim 1, wherein the sealing material is disposed between the conductor spacer and an end of the outer jacket, and between the conductor spacer and an outer end of the break-out boot.

10. A method of assembling a multi-conductor cable, comprising:
providing a multi-conductor cable comprising,
a main body portion,
a break-out portion adjacent to the main body portion,
an outer jacket in the main body portion, and
a plurality of conductors extending within the outer jacket in the main body portion and extending outside of the outer jacket in the break-out portion;
arranging at least one conductor spacer within the break-out portion to engage the plurality of conductors and retain the plurality of conductors in a spaced relationship with one another;
attaching a break-out boot to the outer jacket and arranging the break-out boot around the plurality of conductors in the break-out portion; and
placing sealing material in the break-out boot in spaces between the plurality of conductors.

11. The method of claim 10, wherein:
the at least one conductor spacer comprises a plurality of openings configured to engage and retain the plurality of conductors; and
arranging at least one conductor spacer within the break-out portion to engage the plurality of conductors and retain the plurality of conductors in the spaced relationship with one another comprises arranging the at least one conductor spacer within the break-out portion to cause the plurality of openings to engage and retain the plurality of conductors.

12. The method of claim 10, comprising providing a plurality of openings in the at least one conductor spacer that are configured to enable the sealing material to flow through the at least one conductor spacer.

13. The method of claim 10, wherein:
the plurality of conductors comprises a center conductor disposed substantially along a central axis of the outer jacket and a plurality of outer conductors disposed around the center conductor;
the at least one conductor spacer comprises,
a central portion defining a central opening, and
a plurality of arm members extending radially from the central portion and defining a plurality of outer openings; and
arranging at least one conductor spacer within the break-out portion to engage the plurality of conductors and retain the plurality of conductors in the spaced relationship with one another comprises arranging the at least one conductor spacer to cause the central opening to engage and retain the center conductor, and to cause the plurality of outer openings to engage and retain the plurality of outer conductors.

14. The method of claim 13, wherein connecting the conductor spacers among the plurality of conductor spacers to each other comprises connecting adjacent conductor spacers among the plurality of conductor spacers at pivoting joints formed by interlocking pivot members.

15. The method of claim 13, wherein connecting the conductor spacers among the plurality of conductor spacers to each other comprises connecting adjacent conductor spacers among the plurality of conductor spacers at flexible joints formed by interlocking flexible members.

16. The method of claim 10, wherein:
the at least one conductor spacer comprises a plurality of conductor spacers, each conductor spacer among the plurality of conductor spacers comprising a body member including a central opening; and
arranging at least one conductor spacer within the break-out portion to engage the plurality of conductors and retain the plurality of conductors in the spaced relationship with one another comprises,
connecting the conductor spacers among the plurality of conductor spacers to each other to form a foldable linkage of conductor spacers, and
inserting each conductor among the plurality of conductors in the central opening of a respective conductor spacer among the plurality of conductor spacers.

17. The method of claim 10, wherein the sealing material is a urethane material.

18. The method of claim 10, wherein placing the sealing material in the break-out boot in spaces between the plurality of conductors comprises placing the sealing material between the conductor spacer and an end of the outer jacket, and between the conductor spacer and an outer end of the break-out boot.

* * * * *